Figure 1:
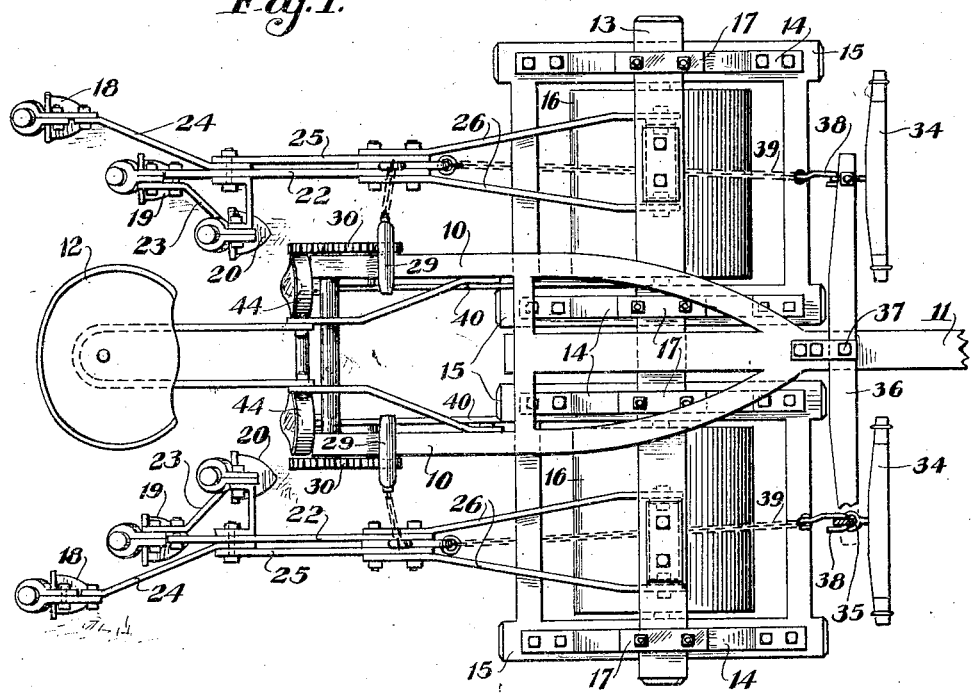

Oct. 5, 1926.

J. McCONNELL 1,602,034

COMBINATION ROLLER AND CULTIVATOR

Filed April 3, 1924　　2 Sheets-Sheet 1

WITNESSES
Louis Goodman
E. N. Lovewell

INVENTOR
James McConnell

BY

ATTORNEY

Oct. 5, 1926.
J. McCONNELL
1,602,034
COMBINATION ROLLER AND CULTIVATOR
Filed April 3, 1924       2 Sheets-Sheet 2
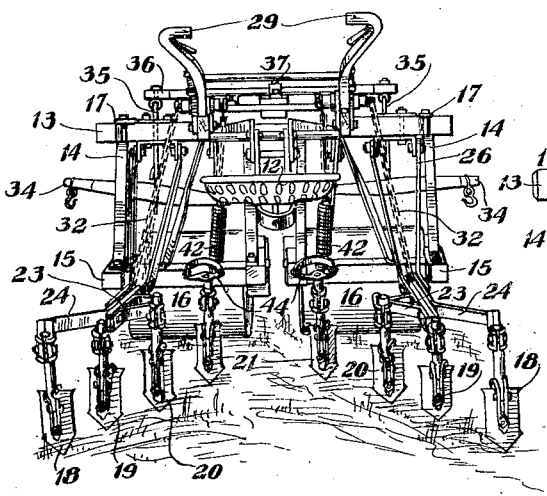
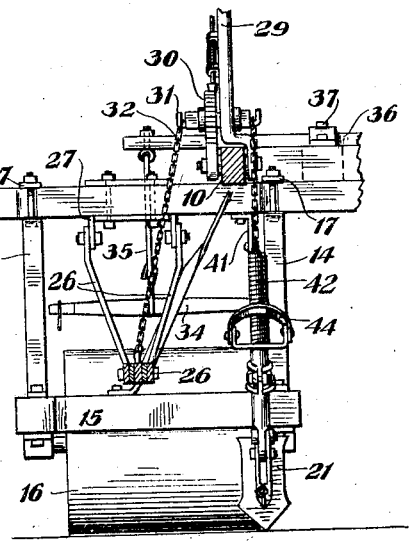
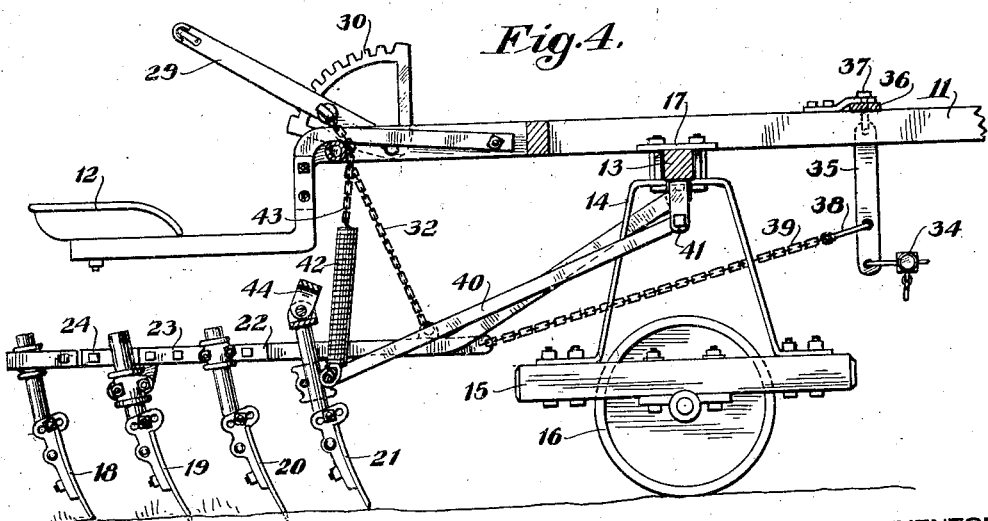
INVENTOR
James McConnell
WITNESSES
BY
ATTORNEY Patented Oct. 5, 1926.

1,602,034

UNITED STATES PATENT OFFICE.

JAMES McCONNELL, OF SPENCERVILLE, OHIO.

COMBINATION ROLLER AND CULTIVATOR.

Application filed April 3, 1924. Serial No. 704,019.

This invention relates to a combination roller and cultivator, which is especially adapted for use in the cultivation of corn, cotton, cane and other crops similarly planted in rows.

In order to obtain the best results in the growing of these crops, it is essential to break up and crush the clods of earth by means of a roller, and then to loosen and stir up the soil on each side of the row and as close to the plants as possible without injuring their roots. Heretofore it has been the usual custom to accomplish this result by going over the ground first with a roller, and then with a two-horse cultivator. If it should rain between the rolling and the cultivating, the ground will bake and be in worse condition than before it was rolled, so that the time and labor thus expended in worse than wasted.

The general object of the present invention is to provide a combination device, preferably adapted to straddle the row of plants and combining the essential features of both a roller and a cultivator, so that a single trip along the row will suffice to put the soil into the best condition.

The invention further includes a novel arrangement of the cultivator teeth, whereby those nearest the plant row may be directly controlled by the feet of the driver, so as to stir the soil as much as possible without injury to the plant.

The invention also includes novel means for connecting the cultivator beams and the rollers to the main frame of the device, so as to promote their efficiency.

With the above and other objects in view, which will be more particularly explained hereafter, the invention comprises various details of construction and combinations of elements, the preferred arrangement of which is fully illustrated in the accompanying drawings to which this specification relates.

Figure 2:
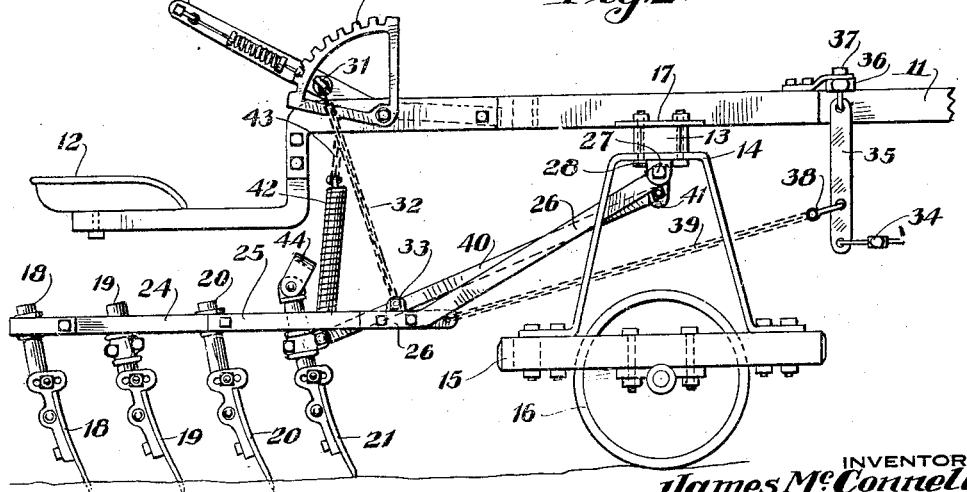

In the drawings:

Figure 1 is a plan view of the invention.
Figure 2 is a side elevation thereof.
Figure 3 is a rear elevation thereof.
Figure 4 is a vertical longitudinal section thereof.
Figure 5 is a detail view showing in rear elevation one of the rollers and one of the cultivator teeth which is directly controlled by the foot.

The device of which my invention constitutes a part, comprises a main frame 10 having a tongue 11 secured to its front end, and a seat 12 for the driver supported by its rear end. A transverse cross beam 13 is secured to the main frame 10, and is supported by brackets 14 carried by supplemental frames 15, in which the rollers 16 are journaled. The brackets 14 are secured to the cross beams 13 by means of yokes 17, which are adjustable longitudinally of the cross beam, so as to adjust the distance between the rollers to accommodate them to the width of the row.

Arranged in rear of each roller 16 are a series of cultivator teeth 18, 19 and 20, in the present instance three in number, and a fourth cultivator tooth 21, which is independently supported for actuation by the driver's foot, as will be hereinafter explained. A frame of any preferred construction may be used for supporting the cultivator teeth 18, 19 and 20, but for the purpose of illustration I have shown the tooth 19 as directly connected to a bar 22, and the tooth 20 secured to a bracket 23, which extends laterally from the bar 22. The tooth 18 is supported by a bar 24, which extends rearwardly and laterally from the bar 22, and is secured between the same and a similar bar 25. The bars 22 and 25 are secured to or integrally connected with forwardly and upwardly extending radius bars 26, which are pivotally connected, as at 27, to a plate 28 bolted or otherwise secured to the under side of the cross beam 13.

The bars 26 may be swung about their pivots 27 to raise or lower the cultivator teeth 18, 19 and 20 by means of a hand lever 29, which cooperates with a quadrant 30 secured to the main frame 10. This lever 29 is provided with a hook 31 engageable with one of the links of a chain 32, which is connected at its lower end to an ear 33, secured to the rear ends of the bars 26 and to the front ends of the bars 22 and 25.

The whiffle-trees 34 are preferably attached to the lower ends of links 35, which depend from the ends of a spreader bar 36, which is pivotally supported at 37 on the rear end of the tongue 11. A hook or clevis 38 is connected to each link 35, near its lower end, and is connected by a chain 39 or the like to the front end of the bars 22 and 25, so that a pull of the draft animals is exerted in a direct line upon the cultivator frame.

Each of the independently supported cultivator teeth 21 is secured to the rear end of a bar 40, the front end of which is pivoted to a plate 41, similar to the plate 20, and secured to the underside of the cross beam 13. The tooth 21 is normally held out of contact with the ground by a contractile coiled spring 42, which connects the shank of the tooth to a chain 43, which is suspended from the lever 29. A stirrup 44, however, is connected to the upper end of the shank of the tooth 21, and may be engaged by the foot of the driver to depress the tooth in opposition to the spring 42 into engagement with the ground.

In the operation of the device, it is adapted to straddle the plant row, and the rollers 16, which are comparatively heavy, not only fulfill the function of supporting wheels for the cultivator frame, but also serve to crush the clods of earth over which they pass. If the ground is soft, they also serve to support the cultivator without cutting in, as wheels with narrow treads would do. The teeth immediately behind the rollers serve to stir up the soil, and leave it in the best condition for retaining moisture, and promoting the growth of the crop. The inner teeth 21 are arranged comparatively close to the plant rows, and wherever the nature of the plant growth permits, they may be easily pressed into the ground by the driver's feet in the stirrups 44, so that the ground is cultivated as thoroughly as it may be without injuring the roots of the plants.

From the foregoing description, the advantages of the invention will be clearly apparent. Not only will it result in a more efficient cultivation than the cultivators hitherto used, but a great saving of time and labor may be effected. It is to be understood, however, that the specific construction of the device herein shown and described is merely for the purpose of illustration, and that many modifications may be made in the various details thereof and the relative arrangement of the various parts without any material departure from the salient features of the invention as herein claimed.

What is claimed is:

1. In a device of the character described, the combination of a cultivator frame, cultivator teeth mounted therein and adapted to normally engage the ground, a supplemental tooth adjacent said cultivator frame, a spring normally holding the supplemental tooth out of contact with the ground while said first-mentioned teeth are engaged in the ground, a stirrup connected with the shank of the supplemental tooth and engageable by the foot of the operator to actuate the same individually in opposition to its spring and to force the same into the ground.

2. In a device of the character described, the combination of a main frame, a pair of supplemental frames in supporting relation to the main frame and adapted to straddle a row of plants, said supplemental frames being independently adjustable toward and from each other, a pair of cultivator frames having forwardly and upwardly extending bars pivotally connected to the main frame, cultivator teeth secured to said cultivator frames, means for raising and lowering the cultivator frames about their respective pivots, a pair of supplemental cultivator teeth located inside of and adjacent the respective cultivator frames, a bar connected to and extending forwardly and upwardly from the shank of each supplemental tooth, the forward ends of said last-mentioned bars being pivotally supported, springs normally holding the supplemental teeth out of contact with the ground while the first-mentioned teeth are engaged in the ground, a stirrup connected with the shank of each supplemental tooth and engageable by the operator to actuate said tooth individually in opposition to its spring and to force the same into the ground.

3. In a device of the character described, the combination of a main frame with a driver's seat supported at its rear end, a pair of opposed cultivator frames pivotally connected to the main frame and vertically adjustable about their pivots, cultivator teeth carried by said cultivator frames, a pair of supplemental cultivator teeth individually supported by the main frame inside of and adjacent the cultivator frames, springs normally holding said supplemental cultivator teeth out of contact with the ground while the first-mentioned teeth are engaged in the ground, a stirrup connected with the shank of each supplemental cultivator tooth and engageable by the foot of a driver on said seat to actuate said tooth individually in opposition to its spring, and to force the same into the ground.

4. In a device of the character described, the combination of a main frame, a pair of supplemental frames in supporting relation to the main frame and adapted to straddle a row of plants, a ground roller journaled in each supplemental frame, a pair of opposed cultivator frames pivotally connected to and extending rearwardly from the main frame in rear of the rollers, cultivator teeth secured to said cultivator frames, means for adjusting said cultivator frames vertically, a pair of supplemental cultivator teeth independently supported by the main frame inside of and adjacent to said cultivator frames, springs normally holding said supplemental cultivator teeth out of contact with the ground, a seat for the driver supported on said main frame, stirrups secured to the shanks of the respective supplemental cultivator teeth and engageable by the feet of a driver on said seat to actuate said supplemental teeth independently in opposition to their respective springs, and to force them into the ground to any desired depth.

In testimony, that I claim the foregoing as my own, I have hereto affixed my signature.

JAMES McCONNELL.